United States Patent
Mizunashi

(10) Patent No.: US 12,460,079 B2
(45) Date of Patent: Nov. 4, 2025

(54) CURABLE SILICONE RESIN COMPOSITION AND CURED PRODUCT THEREOF

(71) Applicant: SHIN-ETSU CHEMICAL CO., LTD., Tokyo (JP)

(72) Inventor: Tomoyuki Mizunashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 469 days.

(21) Appl. No.: 17/690,053

(22) Filed: Mar. 9, 2022

(65) Prior Publication Data

US 2022/0315763 A1 Oct. 6, 2022

(30) Foreign Application Priority Data

Mar. 26, 2021 (JP) .................. 2021-53280

(51) Int. Cl.
- C08L 83/04 (2006.01)
- C08G 77/08 (2006.01)
- C08G 77/12 (2006.01)
- C08G 77/20 (2006.01)
- C08J 5/18 (2006.01)

(52) U.S. Cl.
CPC .............. C08L 83/04 (2013.01); C08G 77/08 (2013.01); C08G 77/12 (2013.01); C08G 77/20 (2013.01); C08J 5/18 (2013.01); C08J 2383/05 (2013.01); C08J 2383/07 (2013.01)

(58) Field of Classification Search
CPC ...... C08L 83/00; C08L 83/04; C08L 2483/04; C08J 5/18
See application file for complete search history.

(56) References Cited

U.S. PATENT DOCUMENTS

| | | | | |
|---|---|---|---|---|
| 2008/0015326 A1* | 1/2008 | Kodama | ............. | C08L 83/04 528/31 |
| 2014/0024796 A1* | 1/2014 | Mizunashi | ............. | G02B 1/041 528/31 |
| 2015/0124338 A1 | 5/2015 | Mayumi et al. | | |
| 2018/0258227 A1* | 9/2018 | Mizunashi | ............. | C08G 77/08 |
| 2021/0292556 A1 | 9/2021 | Kato | | |

FOREIGN PATENT DOCUMENTS

| | | | | |
|---|---|---|---|---|
| JP | 2003155360 A | * | 5/2003 | ........... B29C 59/005 |
| JP | 2009-242541 A | | 10/2009 | |
| JP | 2014-169412 A | | 9/2014 | |
| JP | 2015-093388 A | | 5/2015 | |
| JP | 2015-110752 A | | 6/2015 | |
| JP | 6555921 B2 | | 8/2019 | |
| JP | 2020-193260 A | | 12/2020 | |
| WO | 2019/225178 A1 | | 11/2019 | |

OTHER PUBLICATIONS

Machine translation JP-2003155360-A (Year: 2024).*
Shin-Etsu, "Silicone Fluid KF-96 Performance Test Results" (2020).
Oct. 31, 2023 Office Action issued in Japanese Patent Application No. 2021-053280.

* cited by examiner

Primary Examiner — Alexandre F Ferre
(74) Attorney, Agent, or Firm — Oliff PLC

(57) ABSTRACT

A curable silicone resin composition contains the following components (A) to (D): (A) an organopolysiloxane having two or more and less than six alkenyl groups per molecule each having 2 to 10 carbon atoms; (B) an organopolysiloxane shown by the following formula (1); (C) an organohydrogenpolysiloxane having two or more hydrogen atoms bonded to silicon atoms per molecule, and contained such that the component (C) has a hydrosilyl group in an amount of 0.1 to 4.0 mol per mol of all alkenyl groups bonded to silicon atoms in the curable silicone resin composition; and (D) a platinum group metal-based catalyst. The component (B) is in an amount of 0.1 to 50 mass % relative to a total mass of the components (A) and (B). This invention provides a curable silicone resin composition for forming a silicone resin cured product excellent in mechanical properties, shock absorption, and transparency.

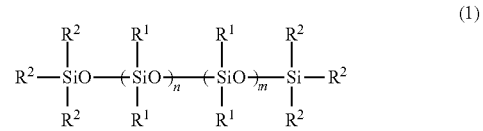

(1)

13 Claims, No Drawings

CURABLE SILICONE RESIN COMPOSITION AND CURED PRODUCT THEREOF

TECHNICAL FIELD

The present invention relates to a curable silicone resin composition and a cured product thereof.

BACKGROUND ART

Among recent electronic devices with displays, such as smartphones, tablet terminals, and so forth, foldable devices are increasingly marketed and required to exhibit superior stretchability and shock (impact) absorption to conventional properties. As conventional shock absorbing films, quite soft gel-like elastomers are commonly employed, and such gel-like elastomers as urethane resins and silicone resins are widely adopted (Patent Documents 1 to 3). However, although shock absorbing materials employing gel-like elastomers have shock absorption to some extent, if more stringent requirements are set for shock absorption, this means the shock absorption performance is demonstrated insufficient in some cases.

Meanwhile, efforts have been made to improve shock absorption by forming multiple shock absorbing layers. Nevertheless, forming multiple layers lowers the light transmittance, resulting in a problem of lowered light extraction efficiency (Patent Document 1).

CITATION LIST

Patent Literature

Patent Document 1: JP 2015-93388 A
Patent Document 2: JP 2009-242541 A
Patent Document 3: JP 6555921 B

SUMMARY OF INVENTION

Technical Problem

The present invention has been made in view of the above-described problems. An object of the present invention is to provide: a silicone resin cured product excellent in mechanical properties, shock absorption, and transparency; and a curable silicone resin composition for forming the cured product.

Solution to Problem

To achieve the object, the present invention provides a curable silicone resin composition comprising the following components (A) to (D):
(A) an organopolysiloxane having two or more and less than six alkenyl groups per molecule, the alkenyl groups each having 2 to 10 carbon atoms;
(B) an organopolysiloxane shown by the following formula (1),

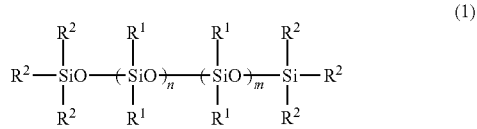
(1)

wherein each $R^1$ independently represents a substituted or unsubstituted alkyl group having 1 to 10 carbon atoms, or an aryl group having 6 to 10 carbon atoms,
each $R^2$ independently represents an alkenyl group having 2 to 10 carbon atoms, and
"n" and "m" represent integers satisfying $0 \leq n$, $0 \leq m$, and $10 \leq n+m \leq 10,000$;
(C) an organohydrogenpolysiloxane having two or more hydrogen atoms bonded to silicon atoms per molecule, and contained such that the component (C) has a hydrosilyl group in an amount of 0.1 to 4.0 mol per mol of all alkenyl groups bonded to silicon atoms in the curable silicone resin composition; and
(D) a platinum group metal-based catalyst,
wherein the component (B) is in an amount of 0.1 to 50 mass % relative to a total mass of the components (A) and (B).

Such a curable silicone resin composition is capable of forming a silicone resin cured product having excellent mechanical properties, stretchability, shock absorption, and transparency.

In this case, the component (A) may comprise:
(A1) a linear organopolysiloxane having two or more alkenyl groups per molecule each bonded to a silicon atom and having 2 to 10 carbon atoms; and
(A2) an organopolysiloxane having a resin structure, two or more alkenyl groups per molecule each bonded to a silicon atom and having 2 to 10 carbon atoms, and one or more hydroxyl groups per molecule each bonded to a silicon atom, wherein the hydroxyl groups are in an amount of 0.001 to 1.0 mol/100 g.

The curable silicone resin composition containing such component (A) can form a silicone resin cured product having more excellent mechanical properties, stretchability, shock absorption, and transparency.

A cured product of the curable silicone resin composition preferably has a type A hardness within a range from 40 to 95 measured by a method according to JIS K 6253-3.

Such a curable silicone resin composition results in a silicone resin cured product having excellent shock absorption, stretchability, and transparency, and also sufficient hardness. Thus, this composition is highly valuable to foldable devices and so forth, which are required to have these properties.

More preferably, a 1-mm thick cured product of the curable silicone resin composition has a direct light transmittance of 80% or more at a wavelength of 450 nm.

Such a curable silicone resin composition results in a silicone resin cured product having higher transparency in addition to excellent shock absorption and stretchability. Thus, this composition is suitable for optical applications.

Moreover, the present invention provides a silicone resin cured product comprising a cured product of the above-described curable silicone resin composition.

Such a silicone resin cured product has excellent shock absorption, stretchability, and transparency.

The silicone resin cured product can be a cured silicone resin sheet.

Such a cured silicone resin sheet (sheet-shaped silicone resin cured product) has excellent shock absorption, stretchability, and transparency, and is thus suitably usable as a light-transmitting shock-buffering material for small electronic devices.

In this case, the present invention can provide a composite film comprising:
a cured product layer comprising the cured silicone resin sheet; and at least one organic polymer film layer,
wherein the cured silicone resin sheet has a thickness of 10 μm or more and 500 μm or less.

Utilizing the shock absorption, stretchability, and transparency of the cured silicone resin sheet, such a composite film is usable as vibration-damping material, sound absorbing material, wearable device encapsulant, stretchable substrate encapsulant, display material, optical memory medium material, optical device material, optical component material, optical fiber material, photofunctional-electronfunctional organic material, peripheral material for semiconductor integrated circuit, other optical applications, etc.

Advantageous Effects of Invention

As described above, the inventive curable silicone resin composition contains the particular components (A) to (D), particularly the components (A) and (B), which are a certain combination of organopolysiloxanes. Accordingly, the inventive composition enables a cured product thereof to have all properties of: high transparency, sufficient hardness, elongation at break, tensile strength, shock resistance, stretchability, and durability.

DESCRIPTION OF EMBODIMENTS

The present inventor and colleagues have earnestly studied to achieve the above-described object and consequently found that a silicone resin cured product excellent in mechanical properties, stretchability, shock absorption, and transparency is obtained by using a curable silicone resin composition containing particular proportions of: (A) an organopolysiloxane having two or more and less than six alkenyl groups per molecule, the alkenyl groups each having 2 to 10 carbon atoms; (B) an organopolysiloxane shown by a particular formula; (C) an organohydrogenpolysiloxane having two or more hydrogen atoms bonded to silicon atoms per molecule; and (D) a platinum group metal-based catalyst. This finding has led to the present invention.

Specifically, the present invention is a curable silicone resin composition comprising the following components (A) to (D):
(A) an organopolysiloxane having two or more and less than six alkenyl groups per molecule, the alkenyl groups each having 2 to 10 carbon atoms;
(B) an organopolysiloxane shown by the following formula (1),

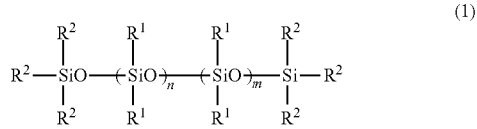

wherein each $R^1$ independently represents a substituted or unsubstituted alkyl group having 1 to 10 carbon atoms, or an aryl group having 6 to 10 carbon atoms,
each $R^2$ independently represents an alkenyl group having 2 to 10 carbon atoms, and
"n" and "m" represent integers satisfying $0 \leq n$, $0 \leq m$, and $10 \leq n+m \leq 10,000$;
(C) an organohydrogenpolysiloxane having two or more hydrogen atoms bonded to silicon atoms per molecule, and contained such that the component (C) has a hydrosilyl group in an amount of 0.1 to 4.0 mol per mol of all alkenyl groups bonded to silicon atoms in the curable silicone resin composition; and
(D) a platinum group metal-based catalyst,
wherein the component (B) is in an amount of 0.1 to 50 mass % relative to a total mass of the components (A) and (B).

Hereinafter, the present invention will be described in detail, but the present invention is not limited thereto.

(A) Organopolysiloxane

In the present invention, the component (A) is an organopolysiloxane having two or more and less than six alkenyl groups per molecule, the alkenyl groups each having 2 to 10 carbon atoms. The component (A) is not particularly limited, as long as the organopolysiloxane has such alkenyl groups. One kind or a combination of two or more kinds of the component (A) may be used. Preferably, the organopolysiloxane has two or more and less than six alkenyl groups per molecule each bonded to a silicon atom and having 2 to 10 carbon atoms.

If the organopolysiloxane has less than two alkenyl groups in one molecule, crosslinking does not take place. Meanwhile, since the number of the alkenyl groups is less than six, the component (A) is clearly distinguished from the component (B) to be described later.

For example, as the organopolysiloxane of the component (A), it is possible to use one or both of: a component (A1), which is a linear organopolysiloxane, and a component (A2), which is an organopolysiloxane having a resin structure.

(A1) Component

The component (A1) is a linear organopolysiloxane having two or more and less than six alkenyl groups per molecule each having 2 to 10 carbon atoms. Preferably, the linear organopolysiloxane has two or more and less than six alkenyl groups per molecule, the alkenyl groups each bonded to a silicon atom and having 2 to 10 carbon atoms.

The component (A1) has an absolute viscosity of 1,000 to 10,000,000 mPa·s, preferably 5,000 to 5,000,000 mPa·s, more preferably 8,000 to 3,000,000 mPa·s, when measured at 25° C. by a method described in JIS K 7117-1:1999.

When the absolute viscosity of the component (A1) is 1,000 mPa·s or more, the resulting cured product will not become brittle. When the absolute viscosity is 10,000,000 mPa·s or less, the workability will not be lowered.

Examples of the alkenyl group having 2 to 10 carbon atoms in the component (A1) include a vinyl group, an allyl group, a propenyl group, an isopropenyl group, a butenyl group, a hexenyl group, a cyclohexenyl group, an octenyl group, etc. Particularly, a vinyl group is preferable. Preferably, the alkenyl group contains no trialkenyl groups.

Besides the aforementioned alkenyl groups, examples of a group that is bonded to a silicon atom in the component (A1) include alkyl groups, such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups, such as a phenyl group, a tolyl group, a xylyl group, and a naphthyl group; aralkyl groups, such as a benzyl group, a phenylethyl group, and a phenylpropyl group; and groups obtained from these groups by substituting a part or all of hydrogen atoms therein with a cyano group or a halogen atom, such as a fluorine atom, a bromine atom, and a chlorine atom. Examples of such substituted groups include a cyanoethyl group; halogen-substituted alkyl groups, such as a chloromethyl group, a chloropropyl group, a bromoethyl group, and a trifluoropropyl group; etc. Among these, a methyl group is preferable.

Specific examples of the component (A1) include the following.

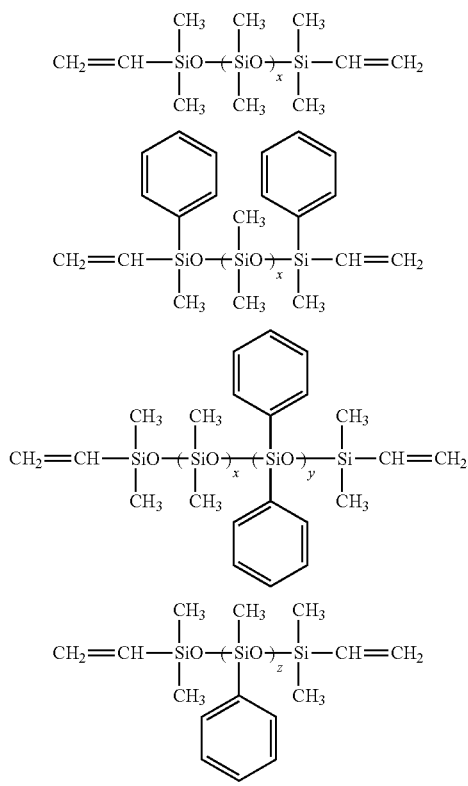

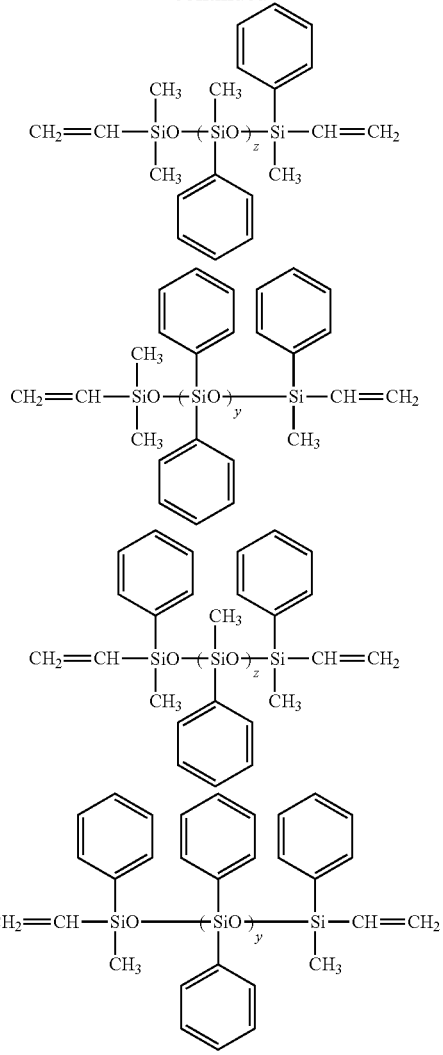

In the formulae, "x", "y", and "z" each represent an integer of 0 or more, and the numbers satisfy x+y+z≥1.

(A2) Component

The component (A2) is an organopolysiloxane having a resin structure, and has two or more and less than six alkenyl groups per molecule, the alkenyl groups having 2 to 10 carbon atoms. Preferably, each of the alkenyl groups is bonded to a silicon atom. For example, the organopolysiloxane with a resin structure contains at least one of an $SiO_{4/2}$ unit and an $R^3SiO_{3/2}$ unit ($R^3$ independently represents a monovalent hydrocarbon group having 1 to 10 carbon atoms), has two or more alkenyl groups per molecule each bonded to a silicon atom and having 2 to 10 carbon atoms, and has one or more hydroxyl groups per molecule each bonded to a silicon atom (silicon atom-bonded hydroxyl group; i.e., silanol group). The hydroxyl groups are in an amount of 0.001 to 1.0 mol/100 g.

In the component (A2), the total content of the $SiO_{4/2}$ unit (Q unit) and the $R^3SiO_{3/2}$ unit (T unit) is preferably 40 to 95 mol %, more preferably 50 to 90 mol %. The component (A2) may contain an $R^4_2SiO_{2/2}$ unit (D unit) and/or an $R^5_3SiO_{1/2}$ unit (M unit).

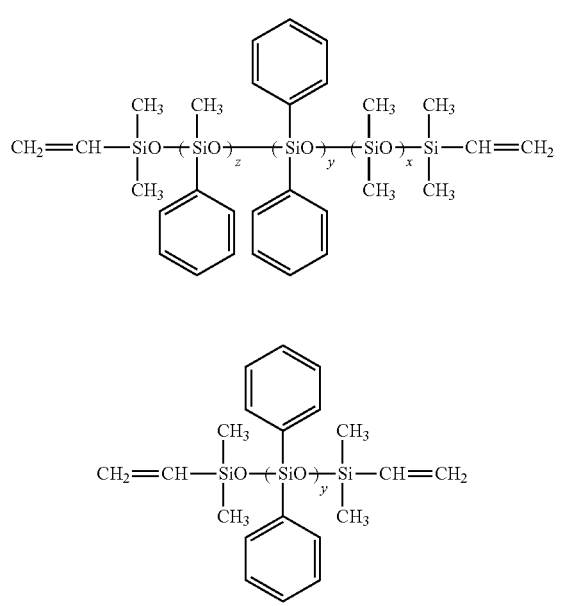

The component (A2) having such composition can be synthesized by: mixing materials which serve as the unit sources exemplified later to achieve a desired molar ratio; and then performing condensation, for example, by co-hydrolysis condensation reaction in the presence of acid catalyst or base catalyst, or by dealkoxylation reaction with metal salt or metal hydroxide.

$R^3$ in the T unit is a monovalent hydrocarbon group having 1 to 10 carbon atoms, preferably having 1 to 6 carbon atoms. Specific examples thereof include lower alkyl groups, such as a methyl group, an ethyl group, a propyl group, and a butyl group; cycloalkyl groups, such as a cyclohexyl group; aryl groups, such as a phenyl group, a tolyl group, and a xylyl group; aralkyl groups, such as a benzyl group; alkenyl groups, such as a vinyl group, an allyl group, a propenyl group, an isopropenyl group, a butenyl group, a hexenyl group, a cyclohexenyl group, and an octenyl group; and groups obtained from these groups by substituting a part or all of hydrogen atoms therein with a cyano group, a halogen atom, such as fluorine, bromine, and chlorine, or the like. Examples of such substituted groups include a chloromethyl group, a cyanoethyl group, a 3,3,3-trifluoropropyl group, etc. Among these, a methyl group or a phenyl group is preferable.

$R^4$ in the D unit and $R^5$ in the M unit are each a monovalent hydrocarbon group having 1 to 10 carbon atoms, preferably having 1 to 6 carbon atoms. Specific examples thereof include the same groups exemplified above for $R^3$.

Examples of the source for the $SiO_{4/2}$ unit (Q unit) include, but are not limited to, sodium silicate, tetraalkoxysilane, and condensation reaction products thereof.

Examples of the source for the $R^3SiO_{3/2}$ unit (T unit) include, but are not limited to, organosilicon compounds, such as organotrichlorosilane and organotrialkoxysilane, as shown by the following structural formulae, and condensation reaction products thereof; organosilicon compounds containing an $HSiO_{2/2}$ unit that can undergo dehydrogenation; etc.

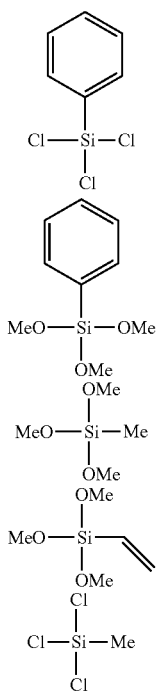

-continued

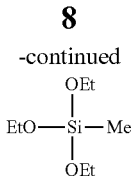

In the formulae, Me represents a methyl group, and Et represents an ethyl group.

Examples of the source for the $R^4_2SiO_{2/2}$ unit (D unit) include, but are not limited to, organosilicon compounds, such as diorganodichlorosilane and diorganodialkoxysilane, as shown by the following structural formulae; etc.

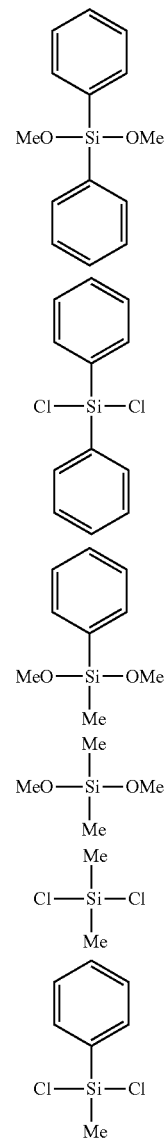

In the formulae, Me represents a methyl group.

Examples of the source for the $R^5_3SiO_{1/2}$ unit (M unit) include, but are not limited to, organosilicon compounds, such as triorganochlorosilane, triorganoalkoxysilane, and hexaorganodisiloxane, as shown by the following structural formulae; etc.

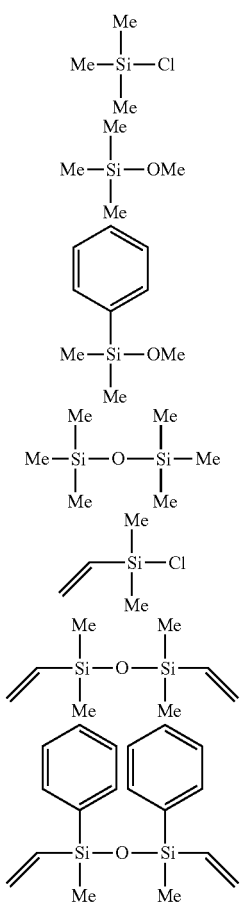

In the formulae, Me represents a methyl group.

Examples of the alkenyl group having 2 to 10 carbon atoms in the component (A2) include a vinyl group, an allyl group, a propenyl group, an isopropenyl group, a butenyl group, a hexenyl group, a cyclohexenyl group, an octenyl group, etc. Particularly, a vinyl group is preferable. Preferably, the alkenyl group contains no trialkenyl groups.

The alkenyl groups in the component (A2) may be incorporated in any unit of the T, D, and M units.

The component (A2) has one or more hydroxyl groups (silanol group) per molecule, the hydroxyl groups each bonded to a silicon atom. The hydroxyl group amount is 0.001 to 1.0 mol/100 g, preferably 0.005 to 0.8 mol/100 g.

When the amount of the hydroxyl group bonded to a silicon atom in the component (A2) is not less than 0.001 mol/100 g, the adhesiveness will not be lowered. When the amount is not more than 1.0 mol/100 g, the surface tackiness after curing will not cause adsorption of dust.

Note that, in the present invention, the amount of the hydroxyl group bonded to a silicon atom refers to a value measured by $^{1}$H-NMR and $^{29}$Si-NMR.

The organopolysiloxane as the component (A2) in the present invention has a weight-average molecular weight (Mw) of 1,500 to 20,000, preferably 2,000 to 10,000. When the molecular weight is 1,500 or more, the composition is surely cured. When the molecular weight is 20,000 or less, the composition is prevented from becoming by far more viscous than necessary and from losing fluidity.

Note that, in the present invention, the weight-average molecular weight (Mw) refers to a weight-average molecular weight measured by gel permeation chromatography (GPC) under the following conditions using polystyrene as standard substance.

Measurement Conditions

Eluent: tetrahydrofuran (THF)
Flow rate: 0.6 mL/min
Detector: differential refractive index detector (RI)
Columns: TSK Guardcolumn SuperH-L
  TSKgel SuperH4000 (6.0 mm I.D.×15 cm×1)
  TSKgel SuperH3000 (6.0 mm I.D.×15 cm×1)
  TSKgel SuperH2000 (6.0 mm I.D.×15 cm×2)
(all are manufactured by Tosoh Corporation)
Column temperature: 40° C.
Sample injection amount: 20 µL (THF solution with a concentration of 0.5 mass %)

The component (A1) is blended within a range of 20 to 100 mass %, preferably 30 mass % or more, more preferably 40 mass % or more, in the component (A). The component (A2) may or may not be incorporated, but is preferably combined with the component (A1) to constitute the component (A). Blending the component (A2) having a resin structure can improve the adhesion strength, physical strength and surface tackiness of the cured product, and can adjust the viscosity of the composition.

(B) Organopolysiloxane

The component (B) is an organopolysiloxane shown by the following formula (1). The organopolysiloxane of the component (B) has six alkenyl groups per molecule and is different from the component (A).

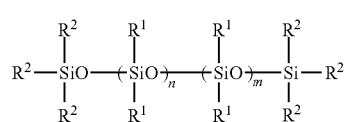

(1)

In the formula, each $R^{1}$ independently represents a substituted or unsubstituted alkyl group having 1 to 10 carbon atoms, or an aryl group having 6 to 10 carbon atoms; each $R^{2}$ independently represents an alkenyl group having 2 to 10 carbon atoms; and "n" and "m" represent integers satisfying $0 \leq n$, $0 \leq m$, and $10 \leq n+m \leq 10,000$.

Examples of the alkenyl group having 2 to 10 carbon atoms in the component (B) include a vinyl group, an allyl group, a propenyl group, an isopropenyl group, a butenyl group, a hexenyl group, a cyclohexenyl group, an octenyl group, etc. Particularly preferable is a vinyl group.

Besides the aforementioned alkenyl groups, examples of a group that is bonded to a silicon atom in the component (B) include alkyl groups, such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group, and a decyl group; aryl groups, such as a phenyl group, a tolyl group, a xylyl group and a naphthyl group; aralkyl groups, such as a benzyl group, a phenylethyl group, and a phenylpropyl group; and groups obtained from these groups by substituting a part or all of hydrogen atoms therein with a cyano group or a halogen atom, such as a fluorine atom, a bromine atom, and a chlorine atom. Examples of such substituted groups include a cyanoethyl group; halogen-substituted alkyl groups, such as a chloromethyl group, a chloropropyl group, a bromoethyl group, and a trifluoropropyl group; etc. Among these, a methyl group is preferable.

"n" and "m", which indicate the length of the component (B), are integers satisfying $0 \le n$, $0 \le m$, and $10 \le n+m \le 10,000$. If n+m is less than 10, the resulting film elongates less, and the shock resistance, stretchability, and durability are impaired. Meanwhile, if n+m exceeds 10,000, crosslinking insufficiently takes place, and the shock resistance and stretchability are impaired. n+m is preferably 100 or more and 5,000 or less.

Specific examples of the component (B) include the following.

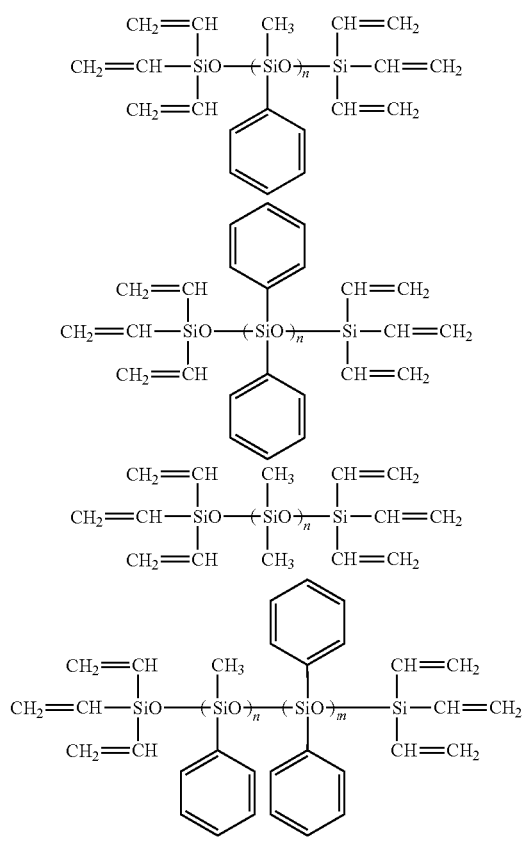

In the formulae, "n" and "m" represent integers satisfying $0 \le n$, $0 \le m$, and $10 \le n+m \le 10,000$.

The amount of the component (B) needs to be 0.1 to 50 mass %, preferably 0.5 to 40 mass %, relative to the total mass of the components (A) and (B).

If the amount of the component (B) is less than 0.1 mass %, the stretchability is impaired. If the amount exceeds 50 mass %, the cured product becomes harder and elongates less.

(C) Organohydrogenpolysiloxane

The component (C) is an organohydrogenpolysiloxane having two or more hydrogen atoms bonded to silicon atoms per molecule.

For example, the component (C) is shown by the following average compositional formula (2).

$$R^6_h H_i SiO_{(4-h-i)/2} \quad (2)$$

In this formula, $R^6$'s may be identical or different, and each represent an unsubstituted or substituted monovalent hydrocarbon group having 1 to 10 carbon atoms. "h" and "i" represent positive numbers satisfying preferably $0.7 \le h \le 2.1$, $0.001 \le i \le 1.0$, and $0.8 \le h+i \le 3.0$, more preferably $1.0 \le h \le 2.0$, $0.01 \le i \le 1.0$, and $1.5 \le h+i \le 2.5$.

Specific examples of $R^6$ include: saturated aliphatic hydrocarbon groups, such as a methyl group, an ethyl group, a propyl group, a butyl group, and a pentyl group; saturated cyclic hydrocarbon groups, such as a cyclopentyl group and a cyclohexyl group; and aromatic hydrocarbon groups. Examples of the aromatic hydrocarbon groups include aryl groups, such as a phenyl group, a tolyl group, and a xylyl group; aralkyl groups, such as a benzyl group, a phenylethyl group, and a phenylpropyl group; etc. Other examples of $R^6$ include groups obtained from these groups by substituting a part or all of hydrogen atoms bonded to a carbon atom(s) therein with a halogen atom, such as fluorine, bromine, and chlorine. Examples of such substituted groups include halogenated hydrocarbon groups, such as a trifluoropropyl group and a chloropropyl group; etc. Among these, preferable are a phenyl group and saturated hydrocarbon groups having 1 to 5 carbon atoms, such as a methyl group, an ethyl group, and a propyl group.

Note that, as the $R^6$, the component (C) preferably has one or more, more preferably 1 to 100, silicon atom-bonded aryl groups per molecule. The organohydrogenpolysiloxane as the component (C) contains at least two (normally, 2 to 200), preferably three or more (normally, 3 to 100), silicon atom-bonded hydrogen atoms (hydrosilyl groups). The component (C) reacts with the components (A) and (B) and works as a crosslinking agent.

The molecular structure of the component (C) is not particularly limited. Any molecular structure such as, for example, linear, cyclic, branched, or three-dimensional network (resinous) structure, may be adopted in the component (C). When the component (C) has a linear structure, the hydrosilyl groups may be bonded to silicon atoms at either or both of terminals and side chains of the molecular chain. Moreover, it is possible to use an organohydrogenpolysiloxane in which the number of silicon atoms in one molecule (or polymerization degree) is normally 2 to 200, preferably 3 to 100 or so, and which is liquid or solid at room temperature (25° C.)

Specific examples of the organohydrogenpolysiloxane shown by the average compositional formula (2) include tris(hydrogendimethylsiloxy)phenylsilane, methylhydrogensiloxane-diphenylsiloxane copolymers capped at both terminals with trimethylsiloxy groups, methylhydrogensiloxane-diphenylsiloxane-dimethylsiloxane copolymers capped at both terminals with trimethylsiloxy groups, methylhydrogensiloxane-methylphenylsiloxane-dimethylsiloxane copolymers capped at both terminals with trimethylsiloxy groups, methylhydrogensiloxane-dimethylsiloxane-diphenylsiloxane copolymers capped at both terminals with dimethylhydrogensiloxy groups, methylhydrogensiloxane-dimethylsiloxane-methylphenylsiloxane copolymers capped at both terminals with dimethylhydrogensiloxy groups; copolymers composed of $(CH_3)_2HSiO_{1/2}$ unit, $SiO_{4/2}$ unit, and $(C_6H_5)_3SiO_{1/2}$ unit; etc.

It is also possible to use organohydrogenpolysiloxanes shown by the following structures without limitation thereto.

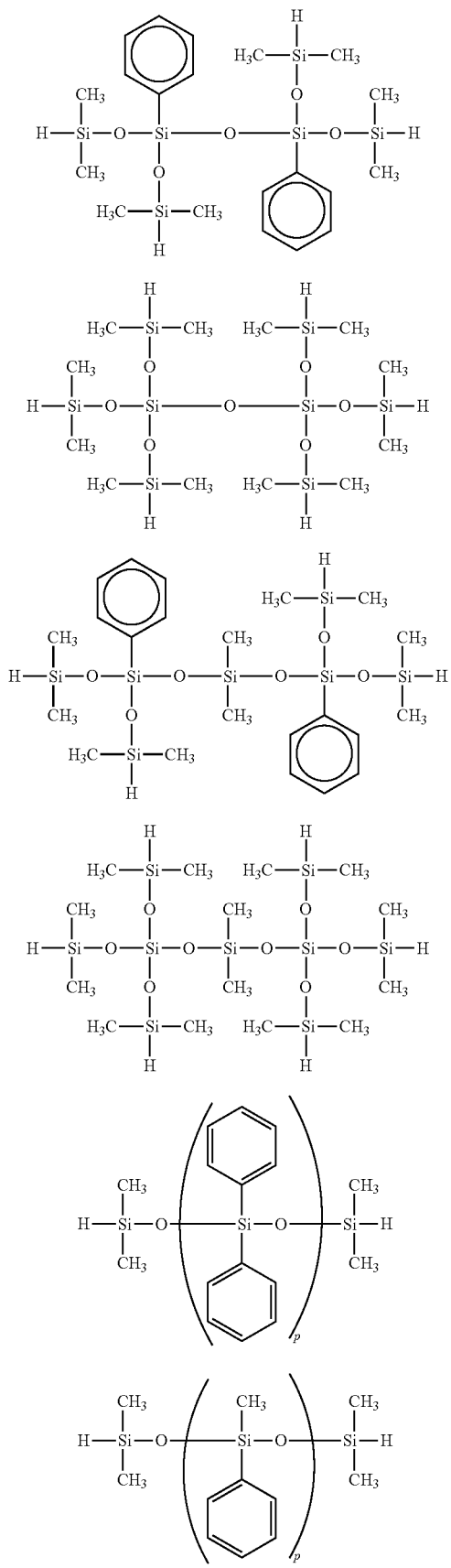

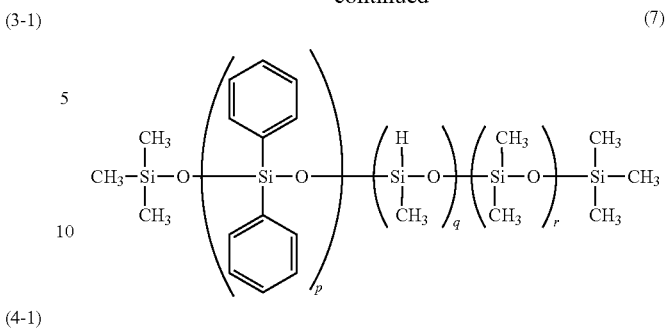

"p" and "r" each represent an integer of 0 or more. "q" represents an integer of 2 or more.

The component (C) is added in such an amount that the component (C) has a hydrosilyl group content of 0.1 to 4.0 mol, preferably 0.5 to 3.0 mol, more preferably 0.8 to 2.0 mol, per mol of all alkenyl groups bonded to silicon atoms in the curable silicone resin composition.

If the component (C) is added in such an amount that the amount of hydrosilyl groups in the component (C) is smaller than 0.1 mol, the curing reaction of the inventive composition does not proceed, making it difficult to obtain a cured silicone product. Even if a cured product is obtained, it has too low crosslinking density, the mechanical strength is not enough, and the heat resistance is adversely influenced. Meanwhile, if the component (C) is added in such an amount that the amount of hydrosilyl groups is larger than 4.0 mol, many hydrosilyl groups remain unreacted in the resulting cured product, so that the physical properties change over time and the heat resistance of the cured product is lowered, for example. Further, foaming due to dehydrogenation reaction may occur in the cured product.

(D) Platinum Group Metal-Based Catalyst

The component (D) is a platinum group metal-based catalyst and blended to cause addition curing reaction of the inventive composition. There are platinum-based, palladium-based, and rhodium-based catalysts. As the catalyst, any catalysts conventionally known to promote hydrosilylation reaction can be used. In consideration of cost and so forth, examples of the platinum-based catalysts include platinum, platinum black, chloroplatinic acid, etc.; specifically, $H_2PtCl_6 \cdot pH_2O$, $K_2PtCl_6$, $KHPtCl_6 \cdot pH_2O$, $K_2PtCl_4$, $K_2PtCl_4 \cdot pH_2O$, $PtO_2 \cdot pH_2O$, $PtCl_4 \cdot pH_2O$, $PtCl_2$, and $H_2PtCl_4 \cdot pH_2O$ (where p represents a positive integer), etc.; complexes thereof with hydrocarbons such as olefins, alcohols, or vinyl group-containing organopolysiloxanes; complexes having optical activity, such as trimethyl(methylcyclopentadienyl)platinum; etc. One of these catalysts can be used alone, or two or more thereof can be used in combination.

The component (D) may be blended in an effective amount for curing. The amount is normally in a range of 0.1 to 500 ppm, particularly preferably 0.5 to 100 ppm, based on the mass of the platinum group metal relative to a total amount of the components (A), (B), and (C).

Additives

As necessary, the inventive curable silicone resin composition may be blended with additives, such as known adhesion promoter, curing inhibitor, and white pigment, other than the components (A) to (D).

Examples of the adhesion promoter include alkoxysilanes, such as phenyltrimethoxysilane, trimethoxysilane, triethoxysilane, methyldimethoxysilane, diphenyldimethoxysilane, methylphenyldimethoxysilane, vinyltrimethoxysilane, vinyltriethoxysilane, 2-(3,4-epoxycyclohexyl)ethyltrimethoxysilane, 3-glycidoxypropyltrimethoxysilane, 3-glycidoxypropylmethyldiethoxysilane, 3-glycidoxypropyltriethoxysilane, 3-methacryloxypropylmethyldiethoxysilane, 3-methacryloxypropyltriethoxysilane, N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, N-phenyl-3-aminopropyltrimethoxysilane, 3-mercaptopropyltrimethoxysilane, 3-isocyanatopropyltriethoxysilane, and 3-cyanopropyltriethoxysilane; oligomers thereof; etc. Note that one of these adhesion promoters can be blended singly, or two or more thereof can be blended in combination.

Moreover, an adhesion promoter is blended in an amount of preferably 0 to 10 mass %, particularly preferably 0 to 5 mass %, relative to the total mass of the components (A) and (B).

Examples of the curing inhibitor include compounds selected from the group consisting of: triallyl isocyanurate, alkyl maleate, acetylene alcohols, silane-modified products and siloxane-modified products thereof, hydroperoxide, tetramethylethylenediamine, benzotriazole, and mixtures thereof; etc. One of these curing inhibitors can be used singly, or two or more thereof can be used in combination.

A curing inhibitor is added in an amount of normally 0.001 to 1.0 parts by mass, preferably 0.005 to 0.5 parts by mass, per 100 parts by mass of the total of the components (A) and (B).

Examples of other additives include reinforcing inorganic fillers of silica, glass fiber, fumed silica, etc.; non-reinforcing inorganic fillers of calcium carbonate, calcium silicate, titanium dioxide, ferric oxide, carbon black, cerium fatty acid salt, barium fatty acid salt, cerium alkoxide, barium alkoxide, etc.; and nano-fillers of silicon dioxide (silica: $SiO_2$), aluminum oxide (alumina: $Al_2O_3$), iron oxide ($FeO_2$), triiron tetraoxide ($Fe_3O_4$), lead oxide ($PbO_2$), tin oxide ($SnO_2$), cerium oxide ($Ce_2O_3$, $CeO_2$), calcium oxide (CaO), trimanganese tetraoxide ($Mn_3O_4$), barium oxide (BaO), etc. These can be appropriately blended in an amount of 600 parts by mass or less (e.g., 0 to 600 parts by mass, normally 1 to 600 parts by mass, preferably 10 to 400 parts by mass) per 100 parts by mass of the total of the components (A) to (D).

As will be described later, such a curable silicone resin composition can form a cured product having a type A hardness within a range of 40 to 95 as measured by a method described in JIS K 6253-3.

Moreover, the curable silicone resin composition can form a cured product having a direct light transmittance of 80% or more at a wavelength of 450 nm when the cured product is formed to have a thickness of 1 mm.

Silicone Resin Cured Product

The present invention provides a silicone resin cured product which is a cured product of the above-described curable silicone resin composition. The shape of the silicone resin cured product is not particularly limited. For example, the inventive silicone resin cured product can be a sheet-shaped silicone resin cured product (cured silicone resin sheet).

The inventive curable silicone resin composition can be applied to a certain substrate according to the use and then cured. As a curing condition, the inventive composition is sufficiently cured even at normal temperature (25° C.), but may be cured by heating as necessary. The heating temperature can be, for example, 60 to 200° C.

The cured product of the curable silicone resin composition preferably has a type A hardness within a range from 40 to 95 measured by a method according to JIS K 6253-3.

More preferably, the inventive curable silicone resin composition results in a cured product having excellent transparency. The cured product which is cured by heating to have a thickness of 1 mm has a direct light transmittance of 70% or more, preferably 80% or more, at a wavelength of 400 to 800 nm, particularly at a wavelength of 450 nm. Note that, in the direct light transmittance measurement, for example, a spectrophotometer U-4100 manufactured by Hitachi Group. can be used.

Additionally, the inventive curable silicone resin composition can be formed into a sheet after applied on an organic polymer film. For example, a cured silicone resin sheet can be prepared by processing the curable silicone resin composition into a sheet form through a heat treatment. The sheet-shaped silicone resin can be used as a single film after separated from the organic polymer film, or can be used while remaining on the organic polymer film.

The inventive silicone resin cured product can be used to provide a composite film including: a cured product layer made of, for example, the cured silicone resin sheet; and at least one organic polymer film layer. In the composite film, the cured silicone resin sheet has a thickness of 10 μm or more and 500 μm or less.

Further, a double-sided adhesive may be applied or pasted on the single film or the composite film of a polymer film and the silicone film so that the film can be pasted on another substrate for use. The thickness of the silicone film is preferably 10 to 500 μm, further preferably 30 to 200 μm. With the thickness of 10 μm or more, the shock absorption performance will not be impaired. With the thickness of 500 μm or less, the film can be used as an electronic device material or component having thickness restriction.

As the organic polymer film, it is possible to use films made of polyethylene, polypropylene, polyethylene terephthalate, polybutylene terephthalate, polyethylene naphthalate, aromatic polyester, polycarbonate, polyamide, aromatic polyamide, polysulfone, polyether ketone, polyamideimide, aromatic polyimide, alicyclic polyimide, fluorinated polyimide, cellulose acetate, polyvinyl chloride, polyacrylate, polyphenol, polystyrene, fluororesin, or the like.

The organic polymer film has a thickness of preferably 30 to 300 μm, further preferably 50 to 200 μm.

As the double-sided adhesive, it is possible to use adhesive films or adhesive agents, such as urethane resin, polyacrylate, and silicone resin.

The thickness of the adhesive layer is preferably 1 to 200 μm, further preferably 5 to 100 μm.

The lamination method for the organic polymer film and the silicone resin cured product is not particularly limited, as long as no adhesion problem arises between the two layers. The adhesion between the organic polymer film and the silicone film can be enhanced by surface activation or heat treatment.

As the surface activation, it is possible to employ ultraviolet, electron beam, X-ray, corona treatment, vacuum plasma treatment, atmospheric plasma treatment, etc.

As the heat treatment, heating at normal temperature or within a temperature range from 30° C. to 300° C. for a certain time can enhance the adhesion between the silicone resin cured product and the organic polymer film, and the adhesion between the double-sided adhesive layer and the two.

The curable silicone resin composition and cured product as described above attain excellent mechanical properties, shock absorption, and transparency.

Semiconductor Device

Furthermore, in the present invention, a sheet formed from the above-described inventive curable silicone resin composition can be suitably used, for example, as a light-transmissive cushioning material for small electronic devices, such as tablets and smartphones.

Moreover, the shock absorption, stretchability, and transparency can be utilized for applications such as, for example, vibration-damping material, sound absorbing material, wearable device encapsulant, stretchable substrate encapsulant, display material, optical memory medium material, optical device material, optical component material, optical fiber material, photofunctional-electronfunctional organic material, peripheral material for semiconductor integrated circuit, and other optical applications.

EXAMPLE

Hereinafter, the present invention will be specifically described by showing Examples and Comparative Examples, but the present invention is not limited thereto. Note that part(s) mean part(s) by mass, Me represents a methyl group, Vi represents a vinyl group, and Ph represents a phenyl group. Each weight-average molecular weight (Mw) was measured as described above by GPC using polystyrene as standard substance. The amounts of hydroxyl group and alkoxy group bonded to a silicon atom were measured by $^1$H-NMR and $^{29}$Si-NMR.

Example 1

Component (A1): a linear organopolysiloxane (A-1) shown by the following formula (8), 50 parts.

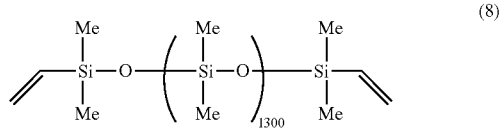

Component (A2): branched methylpolysiloxane composed of 50 mol % of $SiO_{4/2}$ unit, 25 mol % of $ViMe_2SiO_{1/2}$ unit, and 25 mol % of $Me_3SiO_{1/2}$ unit (A-2; Mw=5,000, the amount of hydroxyl groups bonded to silicon atoms=0.001 mol/100 g, the amount of alkoxy groups bonded to silicon atoms=0.01 mol/100 g), 50 parts.

Component (B): an organopolysiloxane (B-1) shown by the following formula (9), 1.5 parts.

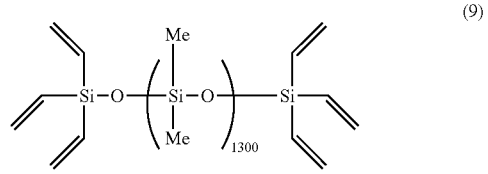

Component (C): an organohydrogenpolysiloxane (C-1) shown by the following formula (10), in which the ratio of the total number of silicon atom-bonded hydrogen atoms in the component (C) to the total number of silicon atom-bonded vinyl groups in the components (A) and (B) (hereinafter, this ratio (molar ratio) may also be referred to as SiH/SiVi) was 1.0.

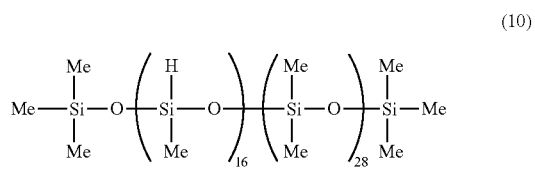

Component (D): an octyl alcohol-modified solution of chloroplatinic acid (platinum element content: 1 mass %), 0.1 parts.

These components were mixed together and thoroughly stirred to prepare a silicone rubber composition. The physical properties of this composition and a cured product obtained from this composition were measured by methods to be described later. Table 1 shows the results.

Example 2

In place of the component (C) used in Example 1, the following compounds were used in combination:

an organohydrogenpolysiloxane (C-1) shown by the following formula (10), in which the ratio of the total number of silicon atom-bonded hydrogen atoms in this component (C-1) to the total number of silicon atom-bonded vinyl groups in the components (A) and (B) (SiH/SiVi) was 0.6.

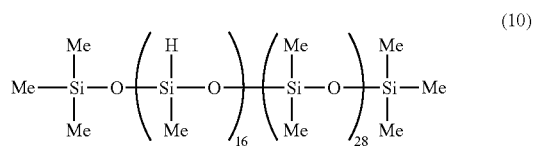

an organohydrogenpolysiloxane (C-2) shown by the following formula (11), in which the ratio of the total number of silicon atom-bonded hydrogen atoms in this component (C-2) to the total number of silicon atom-bonded vinyl groups in the components (A) and (B) (SiH/SiVi) was 0.4.

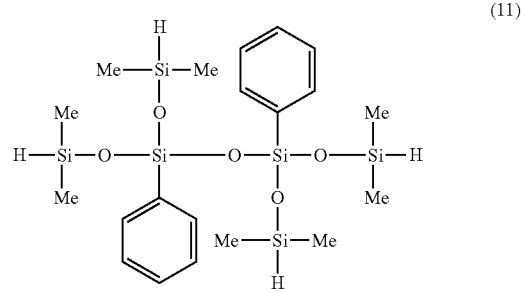 [SMILES: C[SiH](C)O[Si](O[SiH](C)C)(O[Si](O[SiH](C)C)(O[SiH](C)C)c1ccccc1)c1ccccc1]

Except for these, a cured product was formed as in Example 1, and the physical properties were measured. Table 1 shows the results.

Example 3

Component (A1): a linear organopolysiloxane shown by the following formula (8), 60 parts.

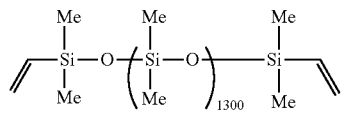

Component (A2): branched methylpolysiloxane composed of 50 mol % of $SiO_{4/2}$ unit, 25 mol % of $ViMe_2SiO_{1/2}$ unit, and 25 mol % of $Me_3SiO_{1/2}$ unit (A-2; Mw=5,000, the amount of hydroxyl groups bonded to silicon atoms=0.001 mol/100 g, the amount of alkoxy groups bonded to silicon atoms=0.01 mol/100 g), 50 parts.

Component (B): an organopolysiloxane shown by the following formula (9), 50 parts.

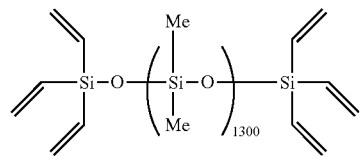

Components (C):
an organohydrogenpolysiloxane shown by the following formula (10), in which the ratio of the total number of silicon atom-bonded hydrogen atoms in this component (C) to the total number of silicon atom-bonded vinyl groups in the components (A) and (B) (SiH/SiVi) was 0.6.

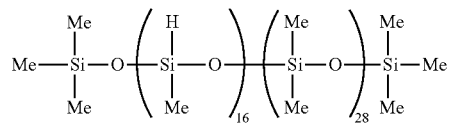

an organohydrogenpolysiloxane shown by the following formula (11), in which the ratio of the total number of silicon atom-bonded hydrogen atoms in this component (C) to the total number of silicon atom-bonded vinyl groups in the components (A) and (B) (SiH/SiVi) was 0.4.

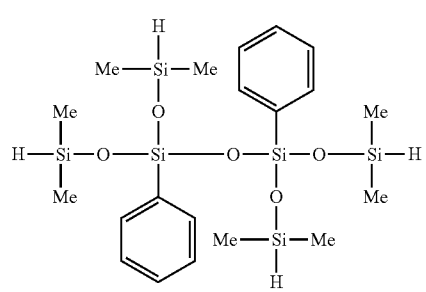

Component (D): an octyl alcohol-modified solution of chloroplatinic acid (platinum element content: 1 mass %), 0.15 parts.

These components were mixed together and thoroughly stirred to prepare a silicone rubber composition. The physical properties of this composition and a cured product obtained from this composition were measured by methods to be described later. Table 1 shows the results.

Example 4

Component (A1): a linear organopolysiloxane shown by the following formula (8), 50 parts.

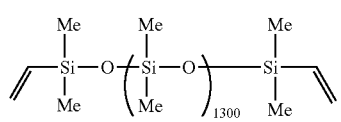

Component (B): an organopolysiloxane shown by the following formula (9), 50 parts.

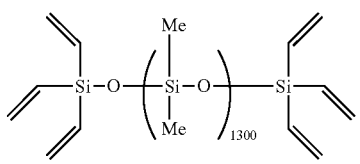

Components (C):
an organohydrogenpolysiloxane shown by the following formula (10), in which the ratio of the total number of silicon atom-bonded hydrogen atoms in this component (C) to the total number of silicon atom-bonded vinyl groups in the components (A) and (B) (SiH/SiVi) was 0.6.

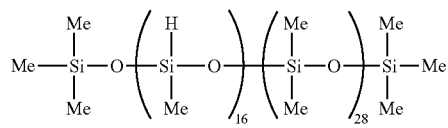

an organohydrogenpolysiloxane shown by the following formula (11), in which the ratio of the total number of silicon atom-bonded hydrogen atoms in this component (C) to the total number of silicon atom-bonded vinyl groups in the components (A) and (B) (SiH/SiVi) was 0.4.

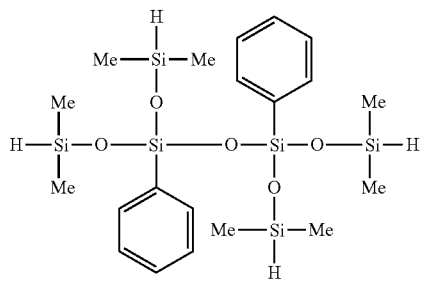

(11)

Component (D): an octyl alcohol-modified solution of chloroplatinic acid (platinum element content: 1 mass %), 0.1 parts.

These components were mixed together and thoroughly stirred to prepare a silicone rubber composition. The physical properties of this composition and a cured product obtained from this composition were measured by methods to be described later. Table 1 shows the results.

Example 5

Except that the blend amount of the component (B) used in Example 1 was changed to 0.11 parts, a cured product was formed as in Example 1, and the physical properties were measured. Table 1 shows the results.

Comparative Example 1

Component (A1): a linear organopolysiloxane shown by the following formula (8), 50 parts.

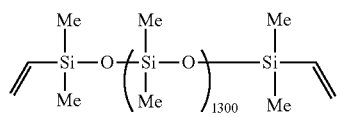

(8)

Component (A2): branched methylpolysiloxane composed of 50 mol % of $SiO_{4/2}$ unit, 25 mol % of $ViMe_2SiO_{1/2}$ unit, and 25 mol % of $Me_3SiO_{1/2}$ unit (Mw=5,000, the amount of hydroxyl groups bonded to silicon atoms=0.001 mol/100 g, the amount of alkoxy groups bonded to silicon atoms=0.01 mol/100 g), 50 parts.

Component (C): an organohydrogenpolysiloxane shown by the following formula (10), in which the ratio of the total number of silicon atom-bonded hydrogen atoms in the component (C) to the total number of silicon atom-bonded vinyl groups in the component (A) (SiH/SiVi) was 1.0.

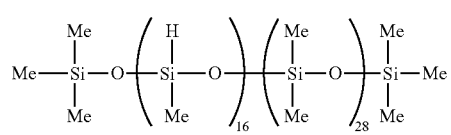

(10)

Component (D): an octyl alcohol-modified solution of chloroplatinic acid (platinum element content: 1 mass %), 0.1 parts.

These components were mixed together and thoroughly stirred to prepare a silicone rubber composition. The physical properties of this composition and a cured product obtained from this composition were measured by methods to be described later. Table 2 shows the results.

Comparative Example 2

Component (A1): a linear organopolysiloxane shown by the following formula (8), 5 parts.

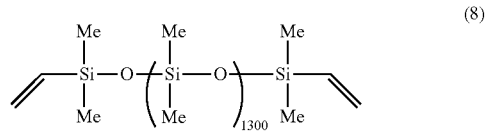

(8)

Component (A2): branched methylpolysiloxane composed of 50 mol % of $SiO_{4/2}$ unit, 25 mol % of $ViMe_2SiO_{1/2}$ unit, and 25 mol % of $Me_3SiO_{1/2}$ unit (Mw=5,000, the amount of hydroxyl groups bonded to silicon atoms=0.001 mol/100 g, the amount of alkoxy groups bonded to silicon atoms=0.01 mol/100 g), 40 parts.

Component (B): an organopolysiloxane shown by the following formula (9), 55 parts.

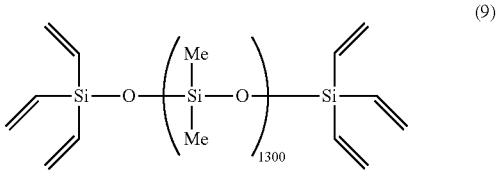

(9)

Component (C): an organohydrogenpolysiloxane shown by the following formula (10), in which the ratio of the total number of silicon atom-bonded hydrogen atoms in the component (C) to the total number of silicon atom-bonded vinyl groups in the components (A) and (B) (SiH/SiVi) was 1.0.

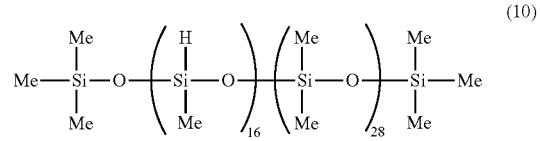

(10)

Component (D): an octyl alcohol-modified solution of chloroplatinic acid (platinum element content: 1 mass %), 0.1 parts.

These components were mixed together and thoroughly stirred to prepare a silicone rubber composition. The physical properties of this composition and a cured product obtained from this composition were measured by methods to be described later. Table 2 shows the results.

Comparative Example 3

Component (A1): a linear organopolysiloxane shown by the following formula (8), 100 parts.

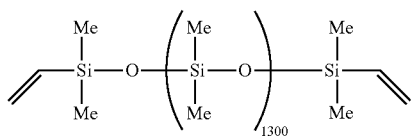

(8)

Component (B): an organopolysiloxane shown by the following formula (9), 0.1 parts.

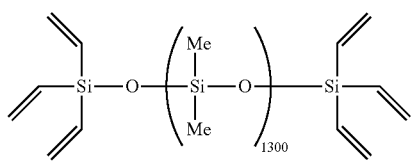

(9)

Components (C):

an organohydrogenpolysiloxane shown by the following formula (10), in which the ratio of the total number of silicon atom-bonded hydrogen atoms in this component (C) to the total number of silicon atom-bonded vinyl groups in the components (A) and (B) (SiH/SiVi) was 0.6.

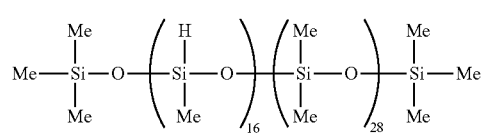

(10)

an organohydrogenpolysiloxane shown by the following formula (11), in which the ratio of the total number of silicon atom-bonded hydrogen atoms in this component (C) to the total number of silicon atom-bonded vinyl groups in the components (A) and (B) (SiH/SiVi) was 0.4.

(11)

![Structure of formula 11]

Component (D): an octyl alcohol-modified solution of chloroplatinic acid (platinum element content: 1 mass %), 0.1 parts.

These components were mixed together and thoroughly stirred to prepare a silicone rubber composition. The physical properties of this composition and a cured product obtained from this composition were measured by methods to be described later. Table 2 shows the results.

Comparative Example 4

Component (A1): a linear organopolysiloxane shown by the following formula (8), 60 parts.

(8)

![Structure of formula 8]

Component (A2): branched methylpolysiloxane composed of 50 mol % of $SiO_{4/2}$ unit, 25 mol % of $ViMe_2SiO_{1/2}$ unit, and 25 mol % of $Me_3SiO_{1/2}$ unit (Mw=5,000, the amount of hydroxyl groups bonded to silicon atoms=0.001 mol/100 g, the amount of alkoxy groups bonded to silicon atoms=0.01 mol/100 g), 50 parts.

Component (B): an organopolysiloxane shown by the following formula (12), 50 parts.

(12)

![Structure of formula 12]

Components (C):

an organohydrogenpolysiloxane shown by the following formula (10), in which the ratio of the total number of silicon atom-bonded hydrogen atoms in this component (C) to the total number of silicon atom-bonded vinyl groups in the components (A) and (B) (SiH/SiVi) was 0.6.

(10)

![Structure of formula 10]

an organohydrogenpolysiloxane shown by the following formula (11), in which the ratio of the total number of silicon atom-bonded hydrogen atoms in this component (C) to the total number of silicon atom-bonded vinyl groups in the components (A) and (B) (SiH/SiVi) was 0.4.

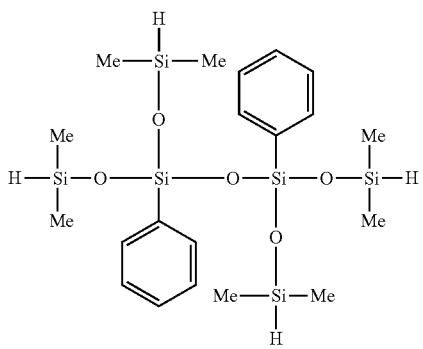

(11)

Component (D): an octyl alcohol-modified solution of chloroplatinic acid (platinum element content: 1 mass %), 0.15 parts.

These components were mixed together and thoroughly stirred to prepare a silicone rubber composition. The physical properties of this composition and a cured product obtained from this composition were measured by methods to be described later. Table 2 shows the results.

Comparative Example 5

Component (A1): a linear organopolysiloxane shown by the following formula (8), 60 parts.

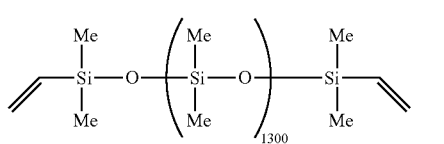

(8)

Component (A2): branched methylpolysiloxane composed of 50 mol % of $SiO_{4/2}$ unit, 25 mol % of $ViMe_2SiO_{1/2}$ unit, and 25 mol % of $Me_3SiO_{1/2}$ unit (Mw=5,000, the amount of hydroxyl groups bonded to silicon atoms=0.001 mol/100 g, the amount of alkoxy groups bonded to silicon atoms=0.01 mol/100 g), 50 parts.

Component (B): an organopolysiloxane shown by the following formula (13), 10 parts.

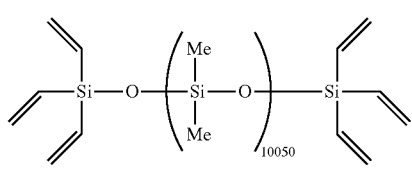

(13)

Components (C):

an organohydrogenpolysiloxane shown by the following formula (10), in which the ratio of the total number of silicon atom-bonded hydrogen atoms in this component (C) to the total number of silicon atom-bonded vinyl groups in the components (A) and (B) (SiH/SiVi) was 0.6.

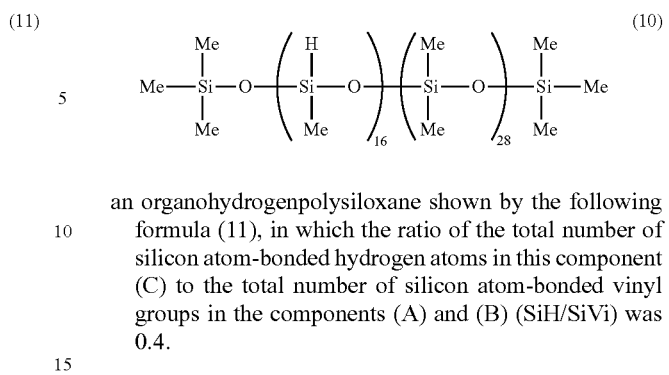

(10)

an organohydrogenpolysiloxane shown by the following formula (11), in which the ratio of the total number of silicon atom-bonded hydrogen atoms in this component (C) to the total number of silicon atom-bonded vinyl groups in the components (A) and (B) (SiH/SiVi) was 0.4.

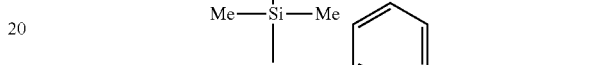

(11)

Component (D): an octyl alcohol-modified solution of chloroplatinic acid (platinum element content: 1 mass %), 0.1 parts.

These components were mixed together and thoroughly stirred to prepare a silicone rubber composition. The physical properties of this composition and a cured product obtained from this composition were measured by methods to be described later. Table 2 shows the results.

Evaluation

The physical properties of the compositions prepared in Examples and Comparative Examples, and cured products thereof were measured by the following methods.

(1) Appearance

Each composition was cured at 150° C. for 4 hours. The resulting cured product (thickness: 1 mm) was visually observed to check the color tone and transparency.

(2) State

Before curing, the fluidity of each composition was checked. The composition was added in an amount of 50 g into a 100-ml glass vial, and the glass vial was horizontally placed and left alone at 25° C. for 10 minutes. The composition was determined to be a liquid when the resin flowed out in this period.

(3) Viscosity

The absolute viscosity at 25° C. of each composition before curing was measured by the method described in JIS K 7117-1:1999 using a rotational viscometer TVB-10 manufactured by Toki Sangyo Co., Ltd. with spindle No. H7 under a rotational speed condition of 6 rpm.

(4) Light Transmittance (Direct Light Transmittance)

Each composition was cured at 150° C. for 1 hour. The light transmittance of the resulting cured product (thickness: 1 mm) at a wavelength of 450 nm was measured at 23° C. using a spectrophotometer U-4100 manufactured by Hitachi Group.

(5) Hardness (Type A)

The hardness of cured products obtained by curing the compositions at 150° C. for 1 hour was measured with a durometer A hardness tester based on JIS K 6249:2003.

(6) Tensile Strength and Elongation at Break

The tensile strength (MPa) and elongation (%) at break of cured products obtained by curing the compositions at 150° C. for 4 hours were measured based on JIS K 6249:2003.

(7) Stretchability

Each composition was cured at 150° C. for 1 hour to prepare a cured product of 10 cm (length)×1 cm (width)× 0.15 mm (thickness). The cured resin film (cured product) was stretched by 40% in the longitudinal direction and kept for 1 minute. Then, the resin film was let alone to see how much the shape of the resin recovered within 1 minute. The stretchability was evaluated according to the following criteria.

Assessment Criteria good: the resulting length in the longitudinal direction was shorter than "1.05×original dimension" poor: the resulting length in the longitudinal direction was not shorter than "1.05×original dimension"

(8) Impact Test

A PET film TN-010 (thickness: 50 μm) manufactured by TOYOBO CO., LTD. was coated with one of the compositions such that the resulting composition has a thickness of 200 μm. The resultant was cured under 150° C. condition for 1 hour. A pressure sensitive film (Prescale for high pressure) manufactured by FUJIFILM Corporation was pasted on the cured silicone film side, and disposed on a SUS substrate such that the pressure sensitive film, the silicone resin cured product, and the PET film were laminated in this order from the bottom. Then, a steel rod (diameter 9 mm×length 46 mm, tip curvature: 3/16) was dropped thereon from a height of 20 cm. The colored area of the pressure sensitive film was read and analyzed through image processing. The shock (impact) absorption was evaluated according to the following criteria.

Assessment Criteria

Each cured product was evaluated based on its relative colored area, given that the colored area obtained under conditions without the silicone resin cured product was taken as 100%.
good: less than 50%
poor: 50% or more (9) Durability Test Silicone resin cured products (each 10 cm×1 cm×1 mm) obtained by curing the compositions at 150° C. for 1 hour were set in Flex cracking Tester, and a 100%-stretching test was repeated 100,000 times to see whether the cured resins broke or not. The shock absorption was evaluated according to the following criteria.

Assessment Criteria good: the cured resin did not break
poor: the cured resin broke during the test

TABLE 1

|  |  | Example | | | | |
|---|---|---|---|---|---|---|
|  |  | 1 | 2 | 3 | 4 | 5 |
| Organopolysiloxane (A-1) | | 50 | 50 | 60 | 50 | 50 |
| Organopolysiloxane (A-2) | | 50 | 50 | 50 | — | 50 |
| Organopolysiloxane (B-1) | | 1.5 | 1.5 | 50 | 50 | 0.11 |
| Organohydrogenpolysiloxane (C-1) | | 1.0 eq | 0.6 eq | 0.6 eq | 0.6 eq | 1.0 eq |
| Organohydrogenpolysiloxane (C-2) | | | 0.4 eq | 0.4 eq | 0.4 eq | |
| Catalyst (D-1) | | 0.1 | 0.1 | 0.15 | 0.1 | 0.1 |
| State | | liquid | liquid | liquid | liquid | liquid |
| Viscosity (Pa · s) | | 40 | 36 | 32 | 34 | 38 |
| Appearance of cured product | color tone | colorless | colorless | colorless | colorless | colorless |
|  | transparency | transparent | transparent | transparent | transparent | transparent |
| Transmittance [1 mm thickness] | | 99 | 99 | 99 | 99 | 99 |
| Hardness (type A) [150° C. × 1 hr] | | 80 | 70 | 45 | 40 | 65 |
| Tensile strength (MPa) | | 8.5 | 6.3 | 5.6 | 4.2 | 7 |
| Elongation at break (%) | | 250 | 500 | 260 | 300 | 550 |
| Impact Test | Colored area (%) of pressure sensitive film | 32 | 36 | 33 | 33 | 40 |
|  | assessment | good | good | good | good | good |
| Stretchability Test | Length (−fold) after test | 1.02 | 1.03 | 1.00 | 1.00 | 1.05 |
|  | assessment | good | good | good | good | good |
| Durability Test | assessment | good | good | good | good | good |

TABLE 2

|  | Comparative Example | | | | |
| --- | --- | --- | --- | --- | --- |
|  | 1 | 2 | 3 | 4 | 5 |
| Organopolysiloxane (A-1) | 50 | 5 | 100 | 60 | 60 |
| Organopolysiloxane (A-2) | 50 | 40 | — | 50 | 50 |
| Organopolysiloxane (B) | — | 55 | 0.1 | 50 | 10 |
| Organohydrogenpolysiloxane (C-1) | 1.0 eq | 1.0 eq | 0.6 eq | 0.6 eq | 0.6eq |
| Organohydrogenpolysiloxane (C-2) |  |  | 0.4 eq | 0.4 eq | 0.4eq |
| Catalyst (D-1) | 0.1 | 0.1 | 0.1 | 0.15 | 0.1 |
| State | liquid | liquid | liquid | liquid | liquid |
| Viscosity (Pa · s) | 36 | 30 | 30 | 25 | 45 |
| Appearance of cured product — color tone | colorless | colorless | colorless | colorless | colorless |
| Appearance of cured product — transparency | transparent | transparent | transparent | transparent | transparent |
| Transmittance [1 mm thickness] | 99 | 99 | 99 | 99 | 99 |
| Hardness (type A) [150° C. × 1 hr] | 83 | 85 | 30 | 84 | 40 |
| Tensile strength (MPa) | 6.7 | 8.9 | 2.2 | 8.5 | 3.5 |
| Elongation at break (%) | 250 | 150 | 300 | 50 | 280 |
| Impact Test — Colored area (%) of pressure sensitive film | 40 | 65 | 55 | 70 | 55 |
| Impact Test — assessment | good | poor | poor | poor | poor |
| Stretchability Test — Length (-fold) after test | 1.10 | 1.01 | 1.12 | broken | 1.1 |
| Stretchability Test — assessment | good | poor | poor | poor | poor |
| Durability Test — assessment | good | poor | good | poor | good |

As shown in Table 1, in Examples 1 to 5, a combination of organopolysiloxanes according to the present invention were used as the components (A) and (B); the obtained cured products had high transparency, and sufficient hardness, elongation at break, tensile strength, shock resistance, stretchability, and durability. In contrast, in Comparative Example 1 not containing the component (B), the resin insufficiently returned in the stretchability test. Further, in Comparative Example 2, the amount of the component (B) exceeded 50 mass % relative to the total mass of the components (A) and (B), and the crosslinking density was so high that the elongation was impaired. The results in the impact test and the durability test were poor. Furthermore, in Comparative Example 3, the amount of the component (B) was smaller than 0.1 mass % relative to the total mass of the components (A) and (B), the hardness was low, and the result in the impact test was poor. In Comparative Example 4, "n" indicative of the length of the component (B) was less than 10, the elongation was impaired, and the results in the impact test, stretchability test, and durability test were poor. Furthermore, in Comparative Example 5, "n" indicative of the length of the component (B) exceeded 10,000, crosslinking took place insufficiently, and the results in the impact test and stretchability test were poor.

As has been described above, the inventive curable silicone resin compositions are capable of forming silicone resin cured products excellent in mechanical properties, stretchability, shock absorption, and transparency.

It should be noted that the present invention is not limited to the above-described embodiments. The embodiments are just examples, and any embodiments that substantially have the same feature and demonstrate the same functions and effects as those in the technical concept disclosed in claims of the present invention are included in the technical scope of the present invention.

The invention claimed is:

1. A curable silicone resin composition comprising the following components (A) to (D):
   (A) an organopolysiloxane having two or more and less than six alkenyl groups per molecule, the alkenyl groups each having 2 to 10 carbon atoms;
   (B) an organopolysiloxane shown by the following formula (1),

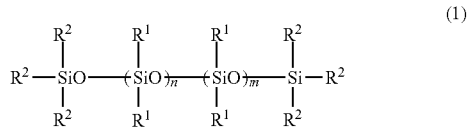

wherein each $R^1$ independently represents a substituted or unsubstituted alkyl group having 1 to 10 carbon atoms, each $R^2$ independently represents an alkenyl group having 2 to 10 carbon atoms, and
   "n" and "m" represent integers satisfying $0 \leq n$, $0 \leq m$, and $10 \leq n+m \leq 10{,}000$;
   (C) an organohydrogenpolysiloxane having two or more hydrogen atoms bonded to silicon atoms per molecule, and contained such that the component (C) has a hydrosilyl group in an amount of 0.1 to 4.0 mol per mol of all alkenyl groups bonded to silicon atoms in the curable silicone resin composition; and
   (D) a platinum group metal-based catalyst, wherein
   the component (A) comprises:
   (A1) a linear organopolysiloxane having two or more alkenyl groups per molecule each bonded to a silicon atom and having 2 to 10 carbon atoms, a group bonded to a silicon atom other than the alkenyl groups in the linear organopolysiloxane being a methyl group; and
   (A2) an organopolysiloxane having a resin structure, two or more alkenyl groups per molecule each bonded to a silicon atom and having 2 to 10 carbon atoms, and one or more hydroxyl groups per molecule each bonded to a silicon atom, wherein the hydroxyl groups are in an amount of 0.001 to 1.0 mol/100 g,
   the component (A2) is a branched methylpolysiloxane composed of $SiO_{4/2}$ unit and $R^5_3SiO_{1/2}$ unit, wherein $R^5$ independently represents a methyl group or a vinyl group,
   the component (A1) is contained within a range of 20 or more to less than 100 mass % in the component (A), and the component (B) is in an amount of 0.1 to 50 mass % relative to a total mass of the components (A) and (B).

2. The curable silicone resin composition according to claim 1, wherein a cured product of the curable silicone resin composition has a type A hardness within a range from 40 to 95 measured by a method according to JIS K 6253-3.

3. A silicone resin cured product comprising a cured product of the curable silicone resin composition according to claim 2.

4. A cured silicone resin sheet comprising the silicone resin cured product according to claim 3.

5. A composite film comprising:
a cured product layer comprising the cured silicone resin sheet according to claim 4; and
at least one organic polymer film layer,
wherein the cured silicone resin sheet has a thickness of 10 μm or more and 500 μm or less.

6. The curable silicone resin composition according to claim 1, wherein a 1-mm thick cured product of the curable silicone resin composition has a direct light transmittance of 80% or more at a wavelength of 450 nm.

7. A silicone resin cured product comprising a cured product of the curable silicone resin composition according to claim 6.

8. A cured silicone resin sheet comprising the silicone resin cured product according to claim 7.

9. A composite film comprising:
a cured product layer comprising the cured silicone resin sheet according to claim 8; and
at least one organic polymer film layer,
wherein the cured silicone resin sheet has a thickness of 10 μm or more and 500 μm or less.

10. A silicone resin cured product comprising a cured product of the curable silicone resin composition according to claim 1.

11. A cured silicone resin sheet comprising the silicone resin cured product according to claim 10.

12. A composite film comprising:
a cured product layer comprising the cured silicone resin sheet according to claim 11; and
at least one organic polymer film layer, wherein the cured silicone resin sheet has a thickness of 10 μm or more and 500 μm or less.

13. The curable silicone resin composition according to claim 1, wherein the component (C) comprises an organohydrogenpolysiloxane having two or more hydrogen atoms bonded to silicon atoms per molecule which is either or both of (i) an organohydrogenpolysiloxane represented by the following formula (3-1) and/or (3-2), and (ii) an organohydrogenpolysiloxane represented by the following formula (7),

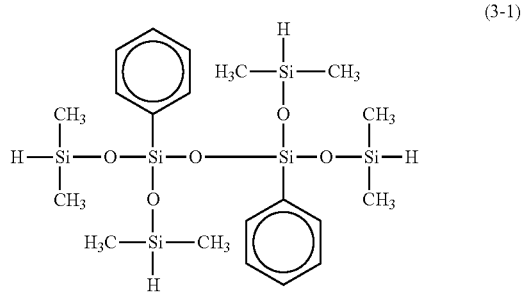

(3-1)

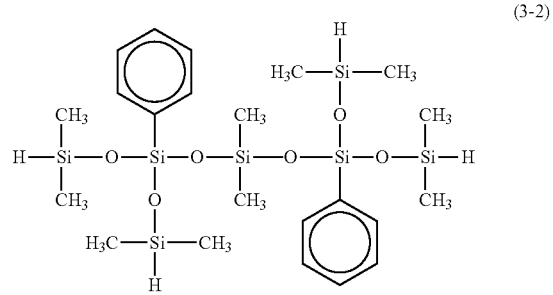

(3-2)

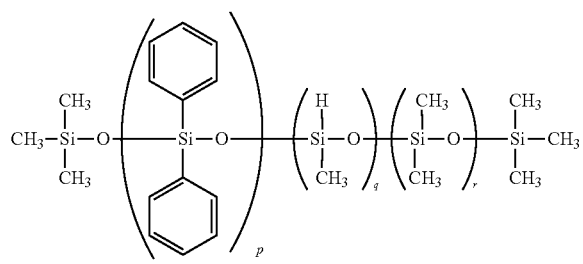

(7)

wherein "p" is 0, "r" represents an integer of 0 or more, and "q" represents an integer of 2 or more.

* * * * *